March 15, 1927. 1,621,276
F. E. RICHARDSON
RAKE
Filed July 8, 1925
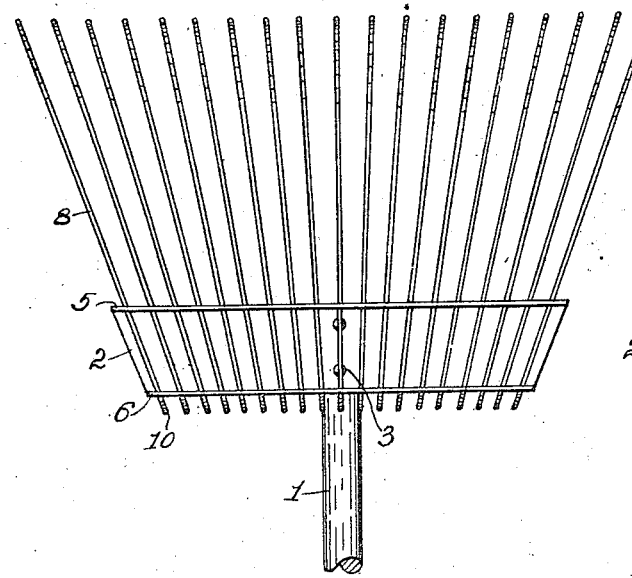
Fig. 1.
Fig. 2.
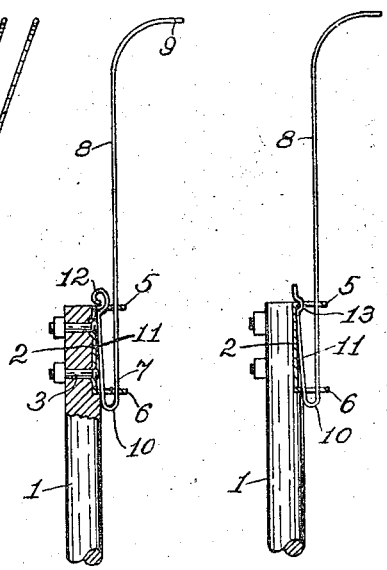
Fig. 3. Fig. 4.
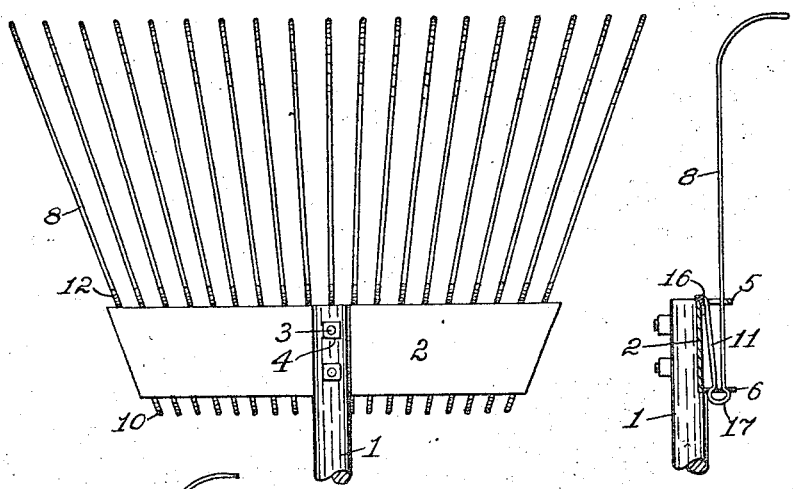
Fig. 6. Fig. 7.
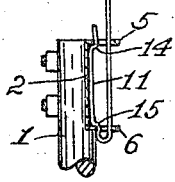
Fig. 5.
Inventor
F. E. Richardson,
By G. C. Kennedy
Attorney Patented Mar. 15, 1927.

1,621,276

UNITED STATES PATENT OFFICE.

FREDERICK E. RICHARDSON, OF MANCHESTER, IOWA.

RAKE.

Application filed July 8, 1925. Serial No. 42,245.

My invention relates to improvements in rakes, and the object of my improvement is to supply a device of this character which by its construction is particularly suited for use as a lawn broom, and yet which by rearrangement or substitutions of its detachably mounted teeth may be employed for other purposes, such as a hand or other cultivator or rake as desired.

This object has been accomplished by the means which are hereinafter described and claimed, and which are illustrated in the accompanying drawings, in which similar numerals of reference denote corresponding parts throughout the several views, it being understood that changes in the precise embodiment of invention herein disclosed can be made within the scope of what is claimed without departing from the spirit of the invention.

In said drawings, Figs. 1 and 2 are respectively elevations of the lower and upper faces of my implement, with a part of the handle removed. Figs. 3 to 7 inclusive are respectively similar cross sections of the device, showing modified shapes of the detachable teeth thereof.

The numeral 1 denotes an elongated handle of usual shape. 2 is a cross-head detachably fastened to one end of said handle by means of bolts 3 and nuts 4 medially and is preferably a channel-bar in cross section whose spaced longitudinal ribs or flanges 5 and 6 have a plurality of alined transverse slots 7. However, while the slots may be arranged in lines parallel with the broom handle 1, yet they are shown arranged in lines divergent therefrom.

Each tine or tooth 8 may be detachably mounted within an alined pair of said slots 7 and releasably interlocked with the walls thereof, or otherwise, as hereinafter described. In the preferred embodiment of the invention as shown in Fig. 3, as in Figs. 1 and 2, the end part of a tooth 8 opposite its curved working terminal 9 is reversely bent upon itself at 10 to provide a resilient member 11 directed upwardly in a looped or hooked manner so as to be introduced within and to traverse alined slots 7 in the cross-head flanges 5 and 6 while under tension. Being bent toward the tooth body 8 under tension before introduction, the parts 8 and 11 tend to spread to hug and engage the opposite ends of the slots 7 in said flanges.

To releasably interlock the tooth in the cross-head, any of a number of different means may be provided without departing from the invention, as shown in said Figs. 3 to 7, as also by other means within the scope of the claims. In Fig. 3, this means consists of shaping the free termination 12 of the member 11 spirally so that when seated the shouldered opening of the spiral engages the outer face of the flange or rib 5 at its end of the slot 7. This prevents displacement of the tooth lengthwise toward the user while under end pressure at its free curved terminal 9. As the whole tooth 8 is resilient, when in use and under working stress, the tooth may spring upwardly along the slot in the flange 5. The dotted lines in Fig. 3 show the shape and position of a substituted heavier rod and shorter tooth 8 as more suitably employed for cultivating garden plants. As all the teeth 8 are detachably assembled with the cross-head, it is obvious that the assemblage of teeth may be much varied, as to alternating shorter with longer teeth, or in removing alternate or certain teeth in order to obtain a special useful arrangement thereof in the implement.

In Fig. 4 the termination of the part 11 has a bend at 13 to engage the end of the slot in the flange 5, while in Fig. 5 the body of the member 11 is offset at 14 and 15 to interlock it with the flanges 5 and 6. In Fig. 6 the bend at 17 is widened into an eye below the flange 6 and the termination 16 bent to engage the flange 5. In Fig. 7 a terminal hook 19 enters a hole in the web 2 at 18 to interlock therewith. When disassembled, the teeth, the cross-head 2 and the handle 1 may be compactly packed together for shipping or storage.

Having described my invention, what I claim as new, and desire to secure by Letters Patent, is:

1 An implement having a channel-bar crosshead whose spaced flanges have opposed transverse slots, and elastic tines mounted interlockingly and detachably on the crosshead, each tine being bent reversely into a loop with unequal members, the loop traversing a pair of the opposed slots with its members near the bend engaging opposite end edges of one of the slots, the termination of the shorter member being shaped to detachably interlock with one end edge of the other slot of the pair while the other member contacts with the opposite end edge of the slot.

2. An implement having a channel-bar crosshead whose spaced flanges have opposed transverse slots, and elastic tines mounted interlockingly and detachably on the crosshead, each tine being bent reversely into a loop with unequal members, the loop traversing a pair of the opposed slots with its members at the bend shaped with an eye by bending to detachably engage opposite end edges of one of the slots, the terminal part of the shorter member being bent to interlock releasably with one end edge of the other slot while the longer member elastically contacts with the opposite end edge of the same slot.

In testimony whereof I affix my signature.

FREDERICK E. RICHARDSON.